US011065741B2

(12) United States Patent
Dahl et al.

(10) Patent No.: US 11,065,741 B2
(45) Date of Patent: Jul. 20, 2021

(54) BRAKE BLEEDER WRENCH

(71) Applicant: A & E Incorporated, Racine, WI (US)

(72) Inventors: Vincent Dahl, Kenosha, WI (US);
Jeffrey J. Kuzmic, Wind Lake, WI (US)

(73) Assignee: A & E Incorporated, Racine, WI (US)

( * ) Notice: Subject to any disclaimer, the term of this patent is extended or adjusted under 35 U.S.C. 154(b) by 247 days.

(21) Appl. No.: 16/156,831

(22) Filed: Oct. 10, 2018

(65) Prior Publication Data
US 2020/0114494 A1    Apr. 16, 2020

(51) Int. Cl.
| *B25B 13/48* | (2006.01) |
| *B60T 17/22* | (2006.01) |
| *B25B 27/00* | (2006.01) |
| *B25B 13/46* | (2006.01) |

(52) U.S. Cl.
CPC .......... *B25B 13/48* (2013.01); *B25B 27/0035* (2013.01); *B60T 17/222* (2013.01); *B25B 13/463* (2013.01)

(58) Field of Classification Search
CPC ... B25B 13/48; B25B 27/0035; B25B 13/463; B25B 13/481; B25B 13/5091; B25B 17/00; B60T 17/222; E21B 19/16
See application file for complete search history.

(56) References Cited

U.S. PATENT DOCUMENTS

| 2,890,612 A * | 6/1959 | Sergan | B25B 21/005 |
| | | | 81/60 |
| 3,318,330 A | 5/1967 | Dobbs | |
| 3,635,262 A * | 1/1972 | Stebbins | B60T 17/222 |
| | | | 141/98 |
| 3,653,262 A | 1/1972 | Stebbins | |
| 3,677,513 A | 7/1972 | Truelove | |
| 3,693,483 A * | 9/1972 | Palmer | B25B 23/15 |
| | | | 81/468 |
| 3,722,329 A * | 3/1973 | Van Hecke | F04C 2/102 |
| | | | 81/10 |
| 4,819,521 A * | 4/1989 | Lang | B25B 13/463 |
| | | | 81/177.1 |
| 6,216,563 B1 | 4/2001 | Hsieh | |
| 6,581,905 B2 | 6/2003 | Rafko et al. | |
| 2013/0014617 A1* | 1/2013 | Kafka | B25B 23/105 |
| | | | 81/125 |

OTHER PUBLICATIONS

Webpage, "Motion Pro Mini Brake Bleeder", dated Oct. 2, 2018, 2 pages. https://www.motosport.com/product/?adpos=1o1&cc=us&creative=281245571192&device=c&gclid=Cj0KCQjwrszdBRDWARIsAEEYhreSpyanOT-j8eFPdQmLlnEzG3HcNm3z6lgcaC37bd3SQl-tXQ00VklaAhDREALw_wcB&key=Motion-Pro-Mini-Brake-Bleeder&matchtype=&mrkgadid=3301756441&mrkgcl=500&network=g&product_id=MOP002Z-X001-Y002&pssource=true&rkg_id=0&segment=badger.
International Search Report dated Jun. 6, 2019 cited in PCT/US2019/023610 filed Mar. 22, 2019.
Written Opinion dated Jun. 6, 2019 cited in PCT/US2019/023610 filed Mar. 22, 2019.

* cited by examiner

*Primary Examiner* — Robert J Scruggs
(74) *Attorney, Agent, or Firm* — Ryan Kromholz & Manion, S.C.

(57) ABSTRACT

A ratcheting brake bleeder wrench is provided which sealingly couples to a bleed valve. The brake bleeder wrench has an internal fluid passageway which allows egress of fluid from a hydraulic brake system. The ratcheting brake bleeder wrench is used to open the bleed valve, allowing egress of fluid, remains in place during the bleeding operation, and reverses direction upon completion of bleeding to tighten the bleed valve back into sealing relationship with the hydraulic brake system.

4 Claims, 3 Drawing Sheets

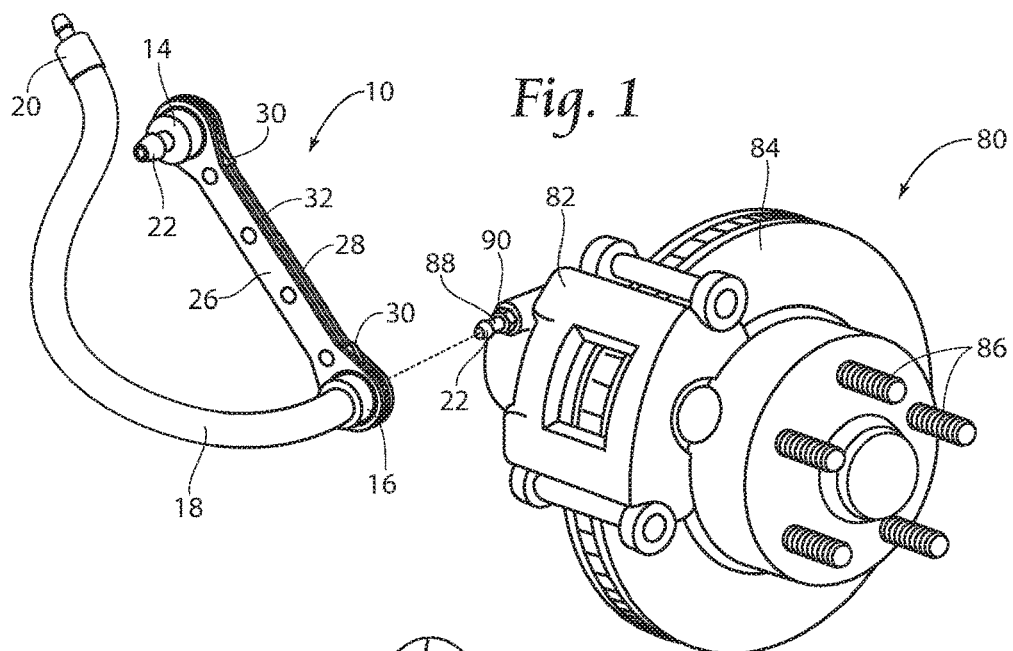
Fig. 1
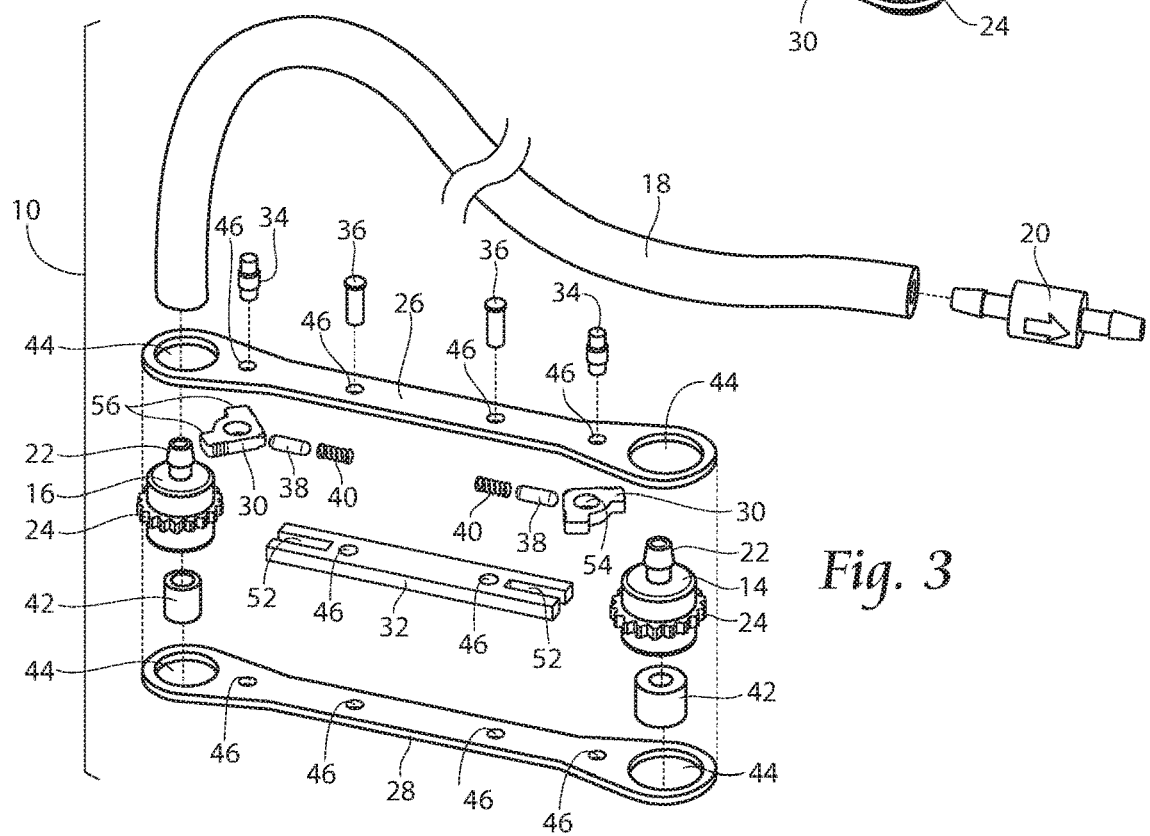
Fig. 2
Fig. 3

ABRAKE BLEEDER WRENCH

BACKGROUND OF THE INVENTION

Vehicles are equipped with brakes to stop or slow when desired. A driver pushes a brake pedal, initiating a sequence that results in hydraulic pressure being applied through a brake line containing brake fluid, to brake caliper pistons, which exert brake pads to slow the vehicle as the brake pads compress against a rotating rotor.

Because brake fluid is not compressible, brake fluid efficiently transfers force into hydraulic pressure allowing the efficient operation of the brake system. However, the presence of air, which is comparatively compressible, in a brake line results in inefficient operation of the brakes.

Air can enter the brake lines in various ways, such as degraded seals. Alternatively, when brake line fluid is changed, as proper maintenance requires, air enters the hydraulic system and the air must be removed. When brake lines are replaced, they initially contain air, but then receive brake fluid as brake fluid is introduced into a brake fluid reservoir, typically under a hood of the car.

The process of removing air from the hydraulic system is called "bleeding" the brake lines. To accomplish this function, a bleed valve is commonly placed on a brake caliper to allow fluid communication (removal or expulsion) with the ordinarily sealed hydraulic system. The bleed valve is shut during hydraulic system operation, but must be opened to allow egress of air from inside the hydraulic system.

A bleed or bleeder valve or screw may contain a check valve to prevent air from entering the hydraulic system or to prevent brake fluid from squirting out of the hydraulic system uncontrollably. The bleeder valve has an external hose barb for coupling an air and fluid release line, and an external hexagonal portion for threadedly coupling and decoupling the bleeder valve to the brake caliper.

In the prior art, such as a Motion Pro mini-brake bleeder, a hex wrench is used for coupling and decoupling the bleeder valve to the brake caliper. To use such a tool, the bleeder valve is first opened, which allows egress of air and brake fluid from the system when the brake pedals are pushed. The bleeding process continues until only brake fluid is released from the hydraulic system, indicating that all air is removed from the brake lines and hydraulic system. Next, a user manually lifts and repositions the wrench to tighten the bleeder valve back onto the brake caliper to reseal the system after all air has been removed. The manual repositioning of the hex wrench complicates the bleeding process of turning the bleeder valve in tight quarters.

SUMMARY OF THE INVENTION

A ratcheting wrench is provided with at least one, preferably two end portions. Each end portion carries a socket wheel, with an external tooth portion. A hose barb is provided at a top end of the socket wheel. At a bottom end of the socket wheel, a hex configuration is provided to engage the external hexagonal portion of the bleeder valve. A resilient insert is provided to internally to the socket wheel to sealingly mate over and with the hose barb on the bleeder valve.

A pawl is provided to select engagement direction of the teeth on the socket wheel, so that the tool is capable of reversible operation without repositioning the tool onto the bleeder valve during operation.

A hose is detachable coupled with the hose barb on the socket wheel, and the hose is preferably provided with a check valve.

BRIEF DESCRIPTION OF THE DRAWINGS

FIG. 1 is a perspective view of a typical brake system and a brake bleeder wrench of the present invention;

FIG. 2 is a perspective view of the brake bleeder wrench of the present invention;

FIG. 3 is an exploded view of the brake bleeder wrench of the present invention;

DESCRIPTION OF THE PREFERRED EMBODIMENT

Figure 4:
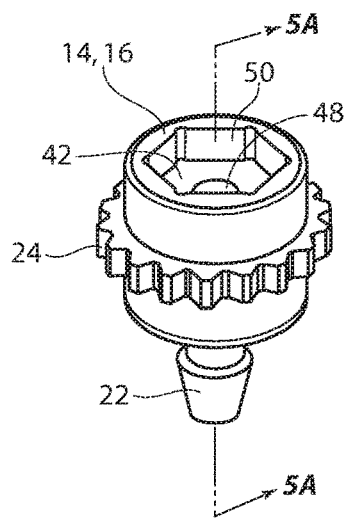
FIG. 4 is a perspective view of a socket wheel.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Referring now to FIG. 1, a perspective view of a typical brake system 80 is shown. A driver pushes a brake pedal (not shown), initiating a sequence that results in hydraulic pressure being applied through a brake line (not shown) containing brake fluid (not shown), to brake caliper pistons (not shown) inside the brake caliper 82. This process engages brake pads (not shown) to frictionally engage with rotor or disc 84 which is coupled to a car wheel (not shown) carried by wheel studs 86, all well known in the art.

A brake fluid line carries brake fluid from a brake fluid reservoir under the hood of the vehicle (not shown), out to each of the four wheels on a car (not shown) as is well known in the art.

The process of removing air from the hydraulic system is called "bleeding" the brake lines. To accomplish this function, a bleed valve 88 is commonly placed on a brake caliper 82 to allow fluid communication with the ordinarily sealed hydraulic system. The bleed valve 88 is shut during hydraulic system operation, but must be opened to allow egress of air from inside the hydraulic system.

A bleed or bleeder valve or screw 88 may contain a check valve to prevent air from entering the hydraulic system or to prevent brake fluid from squirting out of the hydraulic system uncontrollably. The bleeder valve 88 has an external hose barb 22 for coupling an air and fluid release line (commonly a hose), and an external hexagonal portion 90 for threadedly coupling and decoupling the bleeder valve 88 to the brake caliper 82.

Referring now to the inventive brake bleeder wrench 10 of the present invention, the wrench 10 comprises a wrench body 12, a first sized socket 14 and a second sized socket 16, which may be bigger than, smaller than, or equal in size to the first sized socket 14. In one aspect of the present invention, each socket 14 and 16 can be a specific size that engagingly mates with a specific bleeder hex 90 size. In another aspect of the present invention, a set of two wrenches 10 can be provided to accommodate four different bleeder hex 90 sizes.

As will be described later, sockets 14 and 16 allow the internal passage of fluid exiting hose barbs 22, which are preferably coupled with a hose 18 carrying a check valve 20. The bleeder wrench 10 can expel fluid during the bleeding process in this manner. Because the sockets 14/16 can pass fluid, bleeder wrench 10 can remain engaged with bleed valve 88 during the entire bleeding operation, which requires first loosening bleed valve 88 to allow fluid passage, bleeding itself, and last retightening bleed valve 88 to seal the hydraulic system. In prior art methods, loosening and tightening bleed valve 88 became cumbersome and potentially messy. The present bleed wrench 10 greatly simplifies the bleeding process and allows for one person, one hand operation.

Referring now to FIG. 2, a perspective view of the brake bleeder wrench 10 is shown. Preferably the wrench body 12 is formed in layered fashion, with a first handle blank 26 and a second handle blank 28 sandwiching a spacer 32. Spacer 32 allows first handle blank 26 and second handle blank 28 to carry between them pawl 30 and teeth 24 of sockets 14/16.

Referring now to FIG. 3, an exploded view of the brake bleeder wrench 10 of the present invention is shown. To construct brake bleeder wrench 10, first and second handle blanks 26 and 28 are provided with handle socket voids 44, and a plurality of rivet voids 46. Between first and second handle blanks 26 and 28, spacer plate 32 is coupled through rivet voids 46 by rivets 36. Sockets 14/16 are rotatably coupled between first and second handle blanks 26 and 28 by compression provided by shoulder rivets 34 between rivet voids 26 of the first and second handle blanks 26 and 28. Rotation of first and second handle blanks 26 and 28 results in either relative clockwise or counterclockwise motion of the sockets 14/16 relative to the first and second handle blanks 26 and 28. Motion is controlled by pawls 30, which are carried between the first and second handle blanks 26 and 28 by shoulder rivet 34 through pawl void 54. Pawl 30 comprises a pivoted curved bar or lever, and free ends 56 engage teeth 24 in ratcheting fashion. By switching pawl 30, direction of ratcheting is controlled. Free ends 56 engage teeth 24 to allow bidirectional rotation. A user can engage pawl 30, which in turn activates plunger 38 to secure pawl 30 in the selected position, biased by spring 40 (one end held in place by spring voids 52 provided on spacer 32) against pawl 30 and in turn teeth 24.

In order to sealingly mate wrench 10 against bleeder valve 88, resilient seals 42, for instance made of silicon or rubber, are provided internal to sockets 14 and 16 to prevent fluid leaking between the wrench 10 and bleeder valve 88 during use.

Hose 18 carrying check valve 20 on one end, is coupled to one of sockets 14/16 by hose barbs 22.

Figure 5A:
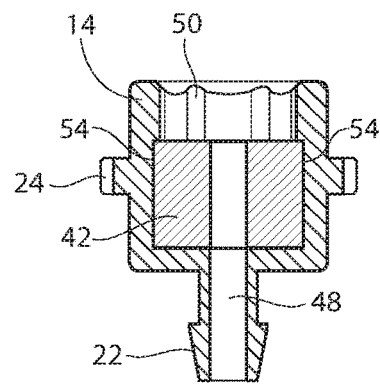
FIGS. 5A and 5B are cross-sectional views of two different sizes of a socket wheel such as shown in FIG. 4.
Figure 5B:
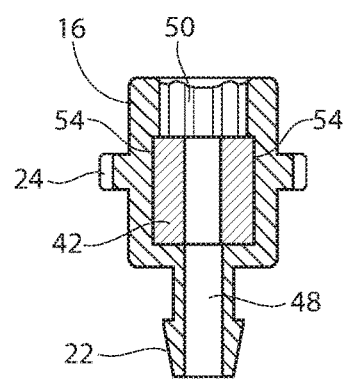

Referring now to FIG. 4, a perspective view of a socket wheel 14/16 is shown. From this view, fluid passageway 48 is visible, internal to hex female pattern 50 on interior sidewalls of socket wheel 14/16. FIGS. 5A and 5B show cross-sectional views of two different sizes of a socket wheels 14/16 such as shown in FIG. 4. In this view, fluid passageway 48 is evident, as well as seals 42, which are provided within a hollow or recess 54 configured to hold seal 42. In this manner seal 42 will receive hose barb 22 of the bleed valve 88 during use as shown in FIG. 6B.

Figure 6A:
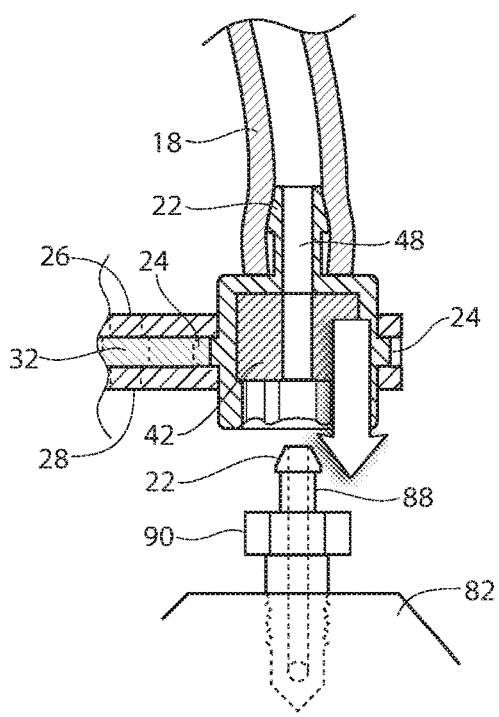
FIG. 6A is a cross-sectional view of the brake bleeder wrench of the present invention being installed onto a bleed valve carried by a wheel caliper.
Figure 6B:
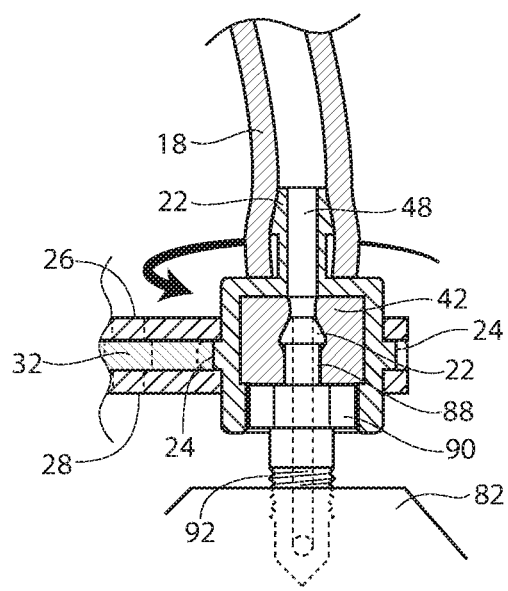
FIG. 6B is a cross-sectional view of the brake bleeder wrench of the present invention loosening the bleed valve carried by a wheel caliper.

Referring now to FIG. 6A, a cross-sectional view of the brake bleeder wrench 10 of the present invention is shown being installed onto a bleed valve 88 carried by a wheel caliper 82. Prior to the bleeding process, bleed valve 88 is shut to contain upstream hydraulic fluid. Next, as shown in FIG. 6B, as the socket 14/16 is placed onto bleed valve 88, resilient insert or seal 42 is coupled about hose barb 22 of bleed valve 88 to seal the system, allowing fluid passage only egressing through fluid passageway 48, next hose 18 and check valve 20. During loosening, hex (or other type of mating engaging pattern) female pattern 50 of socket 14/16 mates with male hex pattern 90 of bleed valve 88. Rotation of brake bleeder wrench 10 in a counterclockwise manner causes bleed valve threads 92 to loosen bleed valve 88 relative to caliper 82.

Figure 6C:
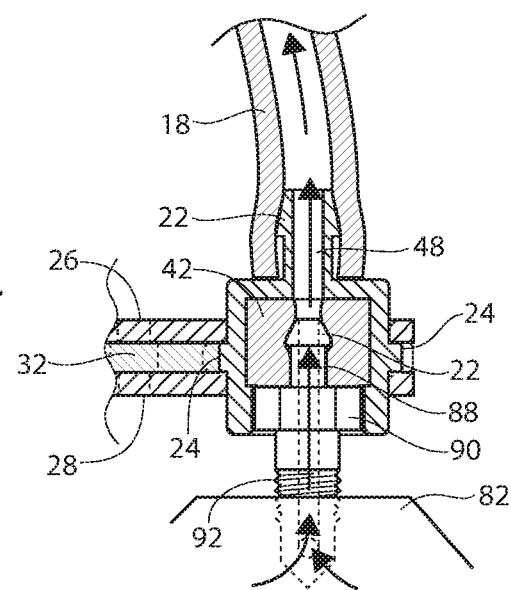
FIG. 6C is a cross-sectional view of bleed valve being used to bleed fluid from a brake system.
Figure 6D:
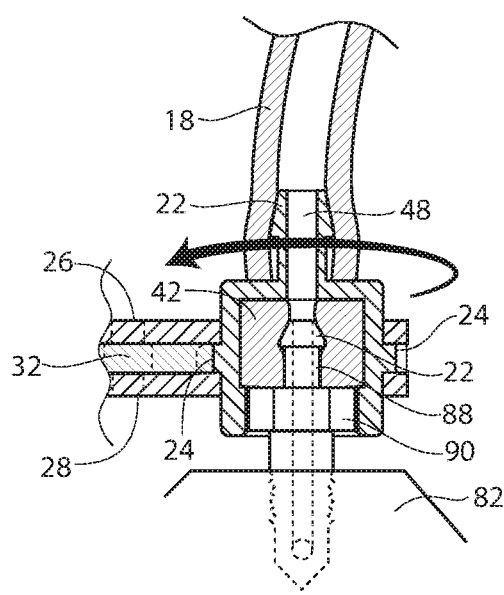
FIG. 6D is a cross-sectional view of the brake bleeder wrench of the present invention tightening the bleed valve carried by a wheel caliper.

As is shown in FIG. 6C, the brake line upstream of caliper 82 undergoes bleeding, the process of removing air from the hydraulic system. After the bleeding is done to the satisfaction of the user, as shown in FIG. 6D, the user reverses direction of pawl 30, which cause the brake bleeder wrench 10 to now tighten the bleed valve 88 back into its sealed position. After tightening, brake bleeder wrench 10 can be removed from bleed valve 88, and the bleeding process is complete.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A brake bleeder wrench comprising:

a handle;

a socket carrying teeth extending about an outer periphery of said socket, said teeth positioned between an upper and a lower surface of said handle;

said teeth engaging a pawl carried by said handle;

said socket rotatably coupled to said handle;

said pawl selectively movable to select between rotating said socket in a counterclockwise direction and a clockwise direction;

said socket further comprising an internal recess that carries a resilient seal within said internal recess of said socket;

said socket comprising a fluid pathway between an underside of said socket, through said resilient seal, and through a topside of said socket and through a check valve carried by a hose downstream of said topside of said socket.

2. A brake bleeder wrench according to claim 1, said brake bleeder wrench further comprising:

a second socket carrying teeth extending about an outer periphery of said second socket, said teeth positioned between said upper and said lower surface of said handle;

said teeth of said second socket engaging a second pawl carried by said handle;

said second socket rotatably coupled to said handle;

said second pawl selectively movable to select between rotating said second socket in said counterclockwise direction and said counterclockwise direction;

said second socket further comprising an internal recess that carries a second resilient seal within said internal recess;

said second socket smaller than said first socket.

3. A method of bleeding a brake line comprising:

providing a brake bleeder wrench comprising a handle, a pawl operably coupled with teeth carried by a first socket of a first size, and a resilient seal carried by an internal recess of said socket;

coupling said seal about a bleed valve;

adjusting a pawl position to select counterclockwise rotation of said socket;

loosening said bleed valve sufficiently to allow fluid egress from said bleed valve;

allowing fluid egress from said bleed valve through said resilient seal and through a check valve carried by a hose;

adjusting said pawl position to select clockwise rotation of said socket;

tightening said bleed valve sufficiently to stop fluid egress from said bleed valve.

4. A method of bleeding a brake line according to claim 3, the method further comprising selecting a selected socket between said first socket and a second socket of a second size, and engaging said selected socket with said bleed valve.

* * * * *